US 7,950,696 B2

(12) United States Patent
Robertson et al.

(10) Patent No.: US 7,950,696 B2
(45) Date of Patent: May 31, 2011

(54) ROLL-OVER PROTECTION SYSTEM

(76) Inventors: David Andrew Robertson, Queensland (AU); Robert John Thornton Parkinson, Queensland (AU)

( * ) Notice: Subject to any disclaimer, the term of this patent is extended or adjusted under 35 U.S.C. 154(b) by 13 days.

(21) Appl. No.: 12/439,856

(22) PCT Filed: Sep. 4, 2007

(86) PCT No.: PCT/AU2007/001298
§ 371 (c)(1),
(2), (4) Date: Jun. 25, 2009

(87) PCT Pub. No.: WO2008/028226
PCT Pub. Date: Mar. 13, 2008

(65) Prior Publication Data
US 2010/0052301 A1    Mar. 4, 2010

(30) Foreign Application Priority Data

Sep. 4, 2006  (AU) ............................... 2006904820
Oct. 23, 2006 (AU) ............................... 2006905873

(51) Int. Cl.
*B60R 21/13* (2006.01)
(52) U.S. Cl. .................... 280/756; 296/190.03
(58) Field of Classification Search .............. 280/756; 296/102, 190.03, 205
See application file for complete search history.

(56) References Cited

U.S. PATENT DOCUMENTS

| 4,047,750 | A | | 9/1977 | Samide | |
|---|---|---|---|---|---|
| 4,158,460 | A | | 6/1979 | White | |
| 5,086,858 | A | * | 2/1992 | Mizuta et al. | 180/68.3 |
| 5,129,676 | A | * | 7/1992 | Sheehan | 280/756 |
| 5,839,758 | A | * | 11/1998 | Finch et al. | 280/756 |
| 7,396,047 | B1 | * | 7/2008 | Young | 280/756 |
| 2005/0156422 | A1 | * | 7/2005 | Della Valle | 280/756 |

FOREIGN PATENT DOCUMENTS

| GB | 1493748 | | 11/1977 |
|---|---|---|---|
| GB | 1552913 | | 9/1979 |
| GB | 2285243 | | 7/1995 |
| JP | 2004-322723 A | * | 11/2004 |

OTHER PUBLICATIONS

International Search Report PCT/AU2007/001298; Dated Oct. 24, 2007.

* cited by examiner

*Primary Examiner* — Ruth Ilan
(74) *Attorney, Agent, or Firm* — Cantor Colburn LLP (57) ABSTRACT

A roll-over protection system (1) for a vehicle (2), such as a quad bike. The system (1) comprises a telescopic hairpin-shaped roll-over guard (3), a lower mount (4) and an upper mount (5) for mounting the guard (3) to regions of the vehicle (2) that may move relative to each other. In use, the guard (3) extends upwardly from the vehicle (2) so as to prevent the vehicle (2) from remaining upside down after having turned over, and the mounts (4, 5) are moveable relative to the guard (3) when the two spaced apart regions move relative to each other during normal use of the vehicle (2).

15 Claims, 8 Drawing Sheets

ROLL-OVER PROTECTION SYSTEM

TECHNICAL FIELD

This invention relates to a roll-over protection system for a vehicle. In particular, the invention concerns a roll-over protection system that prevents the vehicle from rolling upside down or remaining upside down after having rolled over by accident.

BACKGROUND ART

An "all terrain vehicle" (ATV) is a small open motorised buggy designed for off-road use. Four-wheeled ATVs are commonly called "quad bikes". A problem with ATVs is that, during use, they can back flip, forward flip or roll over sideways by accident, and land or remain completely upside down. In doing so, they can pin the rider between the ATV and the ground and/or seriously injure the rider. Other small vehicles, such as mini-excavators, ride-on mowers and snow-mobiles, may have similar problems (ie. generally those types of vehicles where a rider restraint is impractical).

It is an object of the present invention to provide a roll-over protection system for a vehicle which overcomes a problem referred to above.

DISCLOSURE OF INVENTION

According to the present invention, there is provided a roll-over protection system for a vehicle comprising:
  an elongate roll-over guard having a lower region and an upper region; and
  at least one mount for mounting the lower region of the guard to a vehicle such that the guard extends upwardly from the vehicle so as to prevent the vehicle from rolling upside down or remaining upside down should the vehicle have rolled over.

The guard may be of any suitable size, shape and construction. The guard may be of unitary construction or may comprise two or more connectable pieces. The guard may extend upwardly from the vehicle in any suitable way. Preferably, the upper region is arcuate, rounded, angular or triangular such that there is little likelihood of the guard digging into the ground when upside down. Preferably, the upper region encourages the vehicle to slide along the ground rather than to roll to an upside down position. Preferably, the upper region does not extend above the rider's head such that the guard will not interfere with normal operation of the vehicle (say, when travelling through bushland), yet will provide the rider with a protective zone should the vehicle overturn completely.

The guard may have opposed sides situated each side of a longitudinal axis of the vehicle and the opposed sides may extend relative to each other in any suitable way. That is, the sides may extend parallel with one another such that the guard is a substantially inverted U-shape when viewed from a front or rear of the vehicle, or the sides may extend towards each other such that the guard is a substantially inverted V-shaped when viewed from the front or rear.

Preferably, the guard has opposed sides that converge with one another at the upper region. The sides may converge with one another at the upper region in any suitable way.

The guard may be made of any suitable material or materials. The guard may comprise a panel, say, of metal. The guard may comprise a frame or cage. The guard may be of tubular construction or a solid bar that has been bent in the shape of a hairpin—in which case the upper region has a bend of the hairpin and both the upper and lower regions have legs of the hairpin. The legs may extend substantially parallel with one another or away from one another. Preferably, the spacing of the legs at the upper region immediately adjacent the hairpin bend is about 120 mm. The spacing is such that the rider's head cannot pass between the legs.

The guard may comprise an inverted upper U-shaped tube that has the hairpin bend and a pair of lower tubes that provide the lower region of the hairpin. The pair of lower tubes may be extendable within the upper U-shaped tube and lockable thereto. The upper and lower tubes may be locked together in any suitable way, eg. by way of a locking pin extendable through coinciding apertures in the tubes.

Alternatively, the guard may be a tube or solid bar bent in the shape of a crook—ie. having a bent/arcuate upper region and a leg extending downwardly therefrom. If tubular, the guard may comprise two or more connectable tubular pieces.

The guard may comprise a sleeve, such as a sleeve made of rubber, extending over the bend. The sleeve may slide relative to the tube or bar and encourage the vehicle to slide along the ground on its side rather than allow the vehicle to roll completely upside down.

The upper and lower regions may extend entirely within the same plane. The upper and lower regions may not extend entirely within the same plane. In one embodiment, the upper region extends substantially vertically and the lower region extends downwardly and towards a front end of the vehicle. This bend/dog leg in the lower region may help prevent the vehicle from back flipping completely to an upside down position and may help absorb the impact when the vehicle is back flipping.

The guard may be of adjustable length and this may be achieved in any suitable way. For instance, the upper region may comprise two or more telescoping pieces and/or the lower region may comprise two or more telescoping pieces. In one embodiment, the lower region comprises two telescoping pieces that may be locked together at different positions relative to one another. The pieces may be locked together in any suitable way, eg. by way of a locking pin extendable through coinciding apertures in the pieces.

The mount may be of any suitable size, shape and construction. Preferably, the roll-over protection system has at least two mounts for mounting the guard to at least two spaced apart regions of the vehicle. In one embodiment, the system has at least two mounts for mounting the guard to at least two spaced apart regions of the vehicle that may move relative to each other. One or both mounts may allow for movement of the guard relative to the vehicle and this may be achieved in any suitable way.

The mounts may mount the guard to any suitable regions of the vehicle. Preferably, a first mount is attachable to a lower rear region of the vehicle and a second mount is attachable to an upper rear region of the vehicle. The lower rear region of the vehicle may be, for instance, a tow bar, axle, lower body, undercarriage or chassis of the vehicle. The upper region may be, for example, a tray, rack, carriage, bumper, seat, cab or upper body of the vehicle. A suspension system of the vehicle will typically result in the upper and lower regions moving relative to one another.

In one embodiment, the first mount allows for pivotal movement of the guard relative to the vehicle and this may be achieved in any suitable way. Preferably, the first mount comprises a bracket attachable to the tow bar of the vehicle and the lower region of the guard is pinned for pivotal movement relative to the bracket.

In one embodiment, the second mount allows the guard to slide relative to the vehicle and this may be achieved in any suitable way. Preferably, the second mount has one or more openings through which the guard slidably extends. The second mount may comprise a clamping arrangement connectable to the rack or tray of the vehicle. The second mount may comprise a pair of collars supported by the clamping arrangement through which the legs of the guard extend. That is, the legs of the guard tube may extend substantially vertically and slidably through each collar.

The roll-over protection system may be made of any suitable material or materials. Preferably, the roll-over system is made predominantly of metal, eg. aluminium or steel.

The vehicle may be, for example, a small open motorised buggy, mini-excavator or ride-on mower. Preferably, the vehicle is an all terrain vehicle such as a quad bike.

According to a preferred embodiment of the present invention, there is provided a roll-over protection system for a vehicle comprising:
a roll-over guard; and
at least two mounts for mounting the guard to at least two spaced apart regions of the vehicle that may move relative to each other,
wherein in use, the guard extends upwardly from the vehicle so as to prevent the vehicle from rolling upside down or remaining upside down should the vehicle have rolled over, and at least one of said mounts is moveable relative to the guard when the two spaced apart regions move relative to each other.

A preferred embodiment of the invention will now be described, by way of example, with reference to the accompanying figures.

PREFERRED EMBODIMENT OF THE INVENTION

In the figures, like reference numerals refer to like features.

The figures show a roll-over protection system 1 for an all-terrain vehicle (ATV) 2 known as a "quad bike". The system 1 comprises a roll-over guard 3, a first lower mount 4 and a second upper mount 5.

Figure 8:
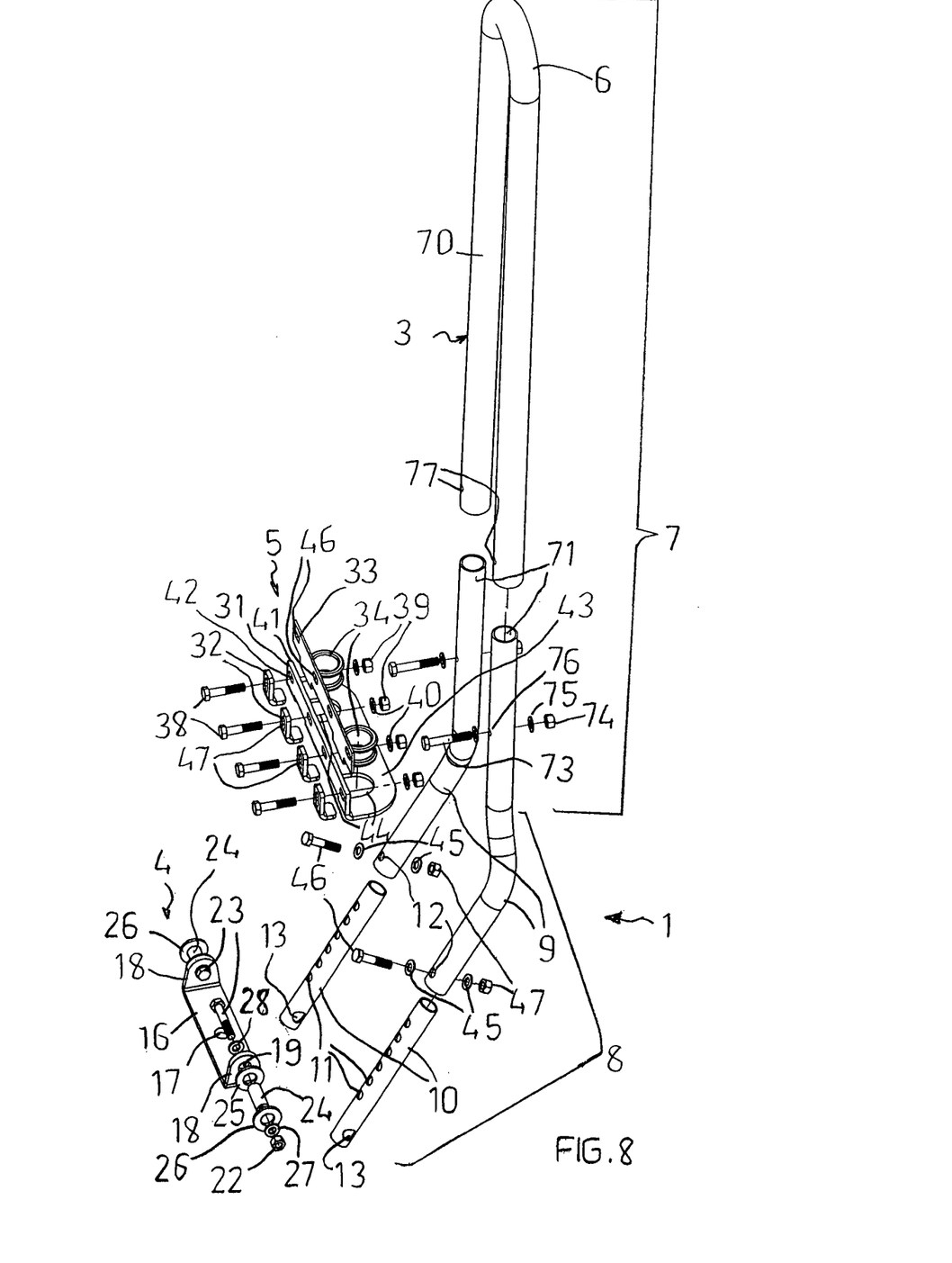
FIG. 8 is an exploded front side perspective view of the roll-over protection system shown in FIG. 1.

The guard 3 is tubular and in the shape of a hairpin having legs and an interconnecting bend 6. As seen in FIGS. 3 and 8, the guard 3 has an upwardly extending upper region 7 having the bend 6, and a lower region 8 that extends downwardly from the upper region 7 and towards a front of the vehicle 2 (ie. the lower region 8 has a dog leg). The legs extend from the bend 6 to the first mount 4. A foam rubber sleeve 90 (shown only in FIG. 2) extends over the bend 6. The legs can extend away from one another (as shown in the figures) or substantially parallel with one another. Immediately adjacent the bend 6, the legs are spaced about 120 mm from each other such that the rider's head cannot pass between the legs.

Figure 7:
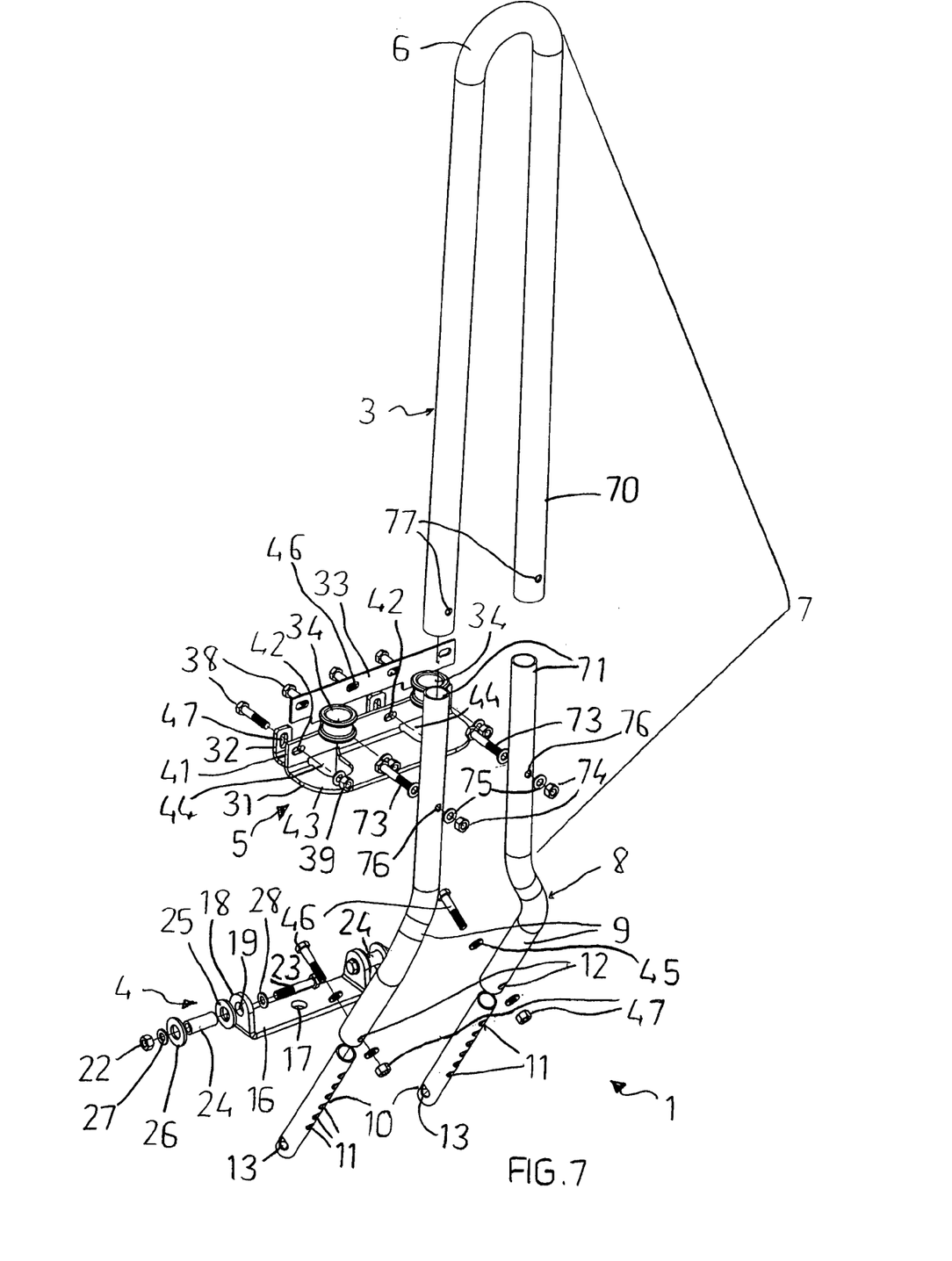
FIG. 7 is an exploded rear side perspective view of the roll-over protection system shown in FIG. 1.

As seen in FIGS. 7 and 8, the guard 3 comprises an inverted upper U-shaped tube 70 and a pair of lower tubes 71 that provide the lower region of the guard 3. The pair of lower tubes 71 are extendable within the upper U-shaped tube 70 and lockable thereto. The upper 70 and lower tubes 71 are pinned together by way of a pair of locking bolt 73, nuts 74 and washers 75. The locking bolts 73 extend through coinciding apertures 76, 77 in the upper 70 and lower 71 tubes.

As seen in FIGS. 5-8, the lower region 8 is telescopic and comprises an upper leg piece 9 and a lower leg piece 10. Lower leg piece 10 is of smaller diameter than upper leg piece 9. As seen in FIGS. 7 and 8, lower leg piece 10 has a series of holes 11 (only some of which have been labelled) spaced along a length of the piece 10. Upper leg piece 9 has a single hole 12. These holes 11, 12 enable the lower region 8 to be shortened or lengthened, as required. When the holes 11, 12 coincide, the leg pieces 9, 10 are pinned together using a nut 47, bolt 46 and pair of washers 45 (see FIG. 8). The telescopic nature of the lower region 8 enables the system 1 to be retro-fitted to many different types of vehicles.

As seen in FIGS. 5-8, lower leg piece 10 has an additional pair of opposed openings 13 for pivotal connection to the first mount 4.

Figure 1:
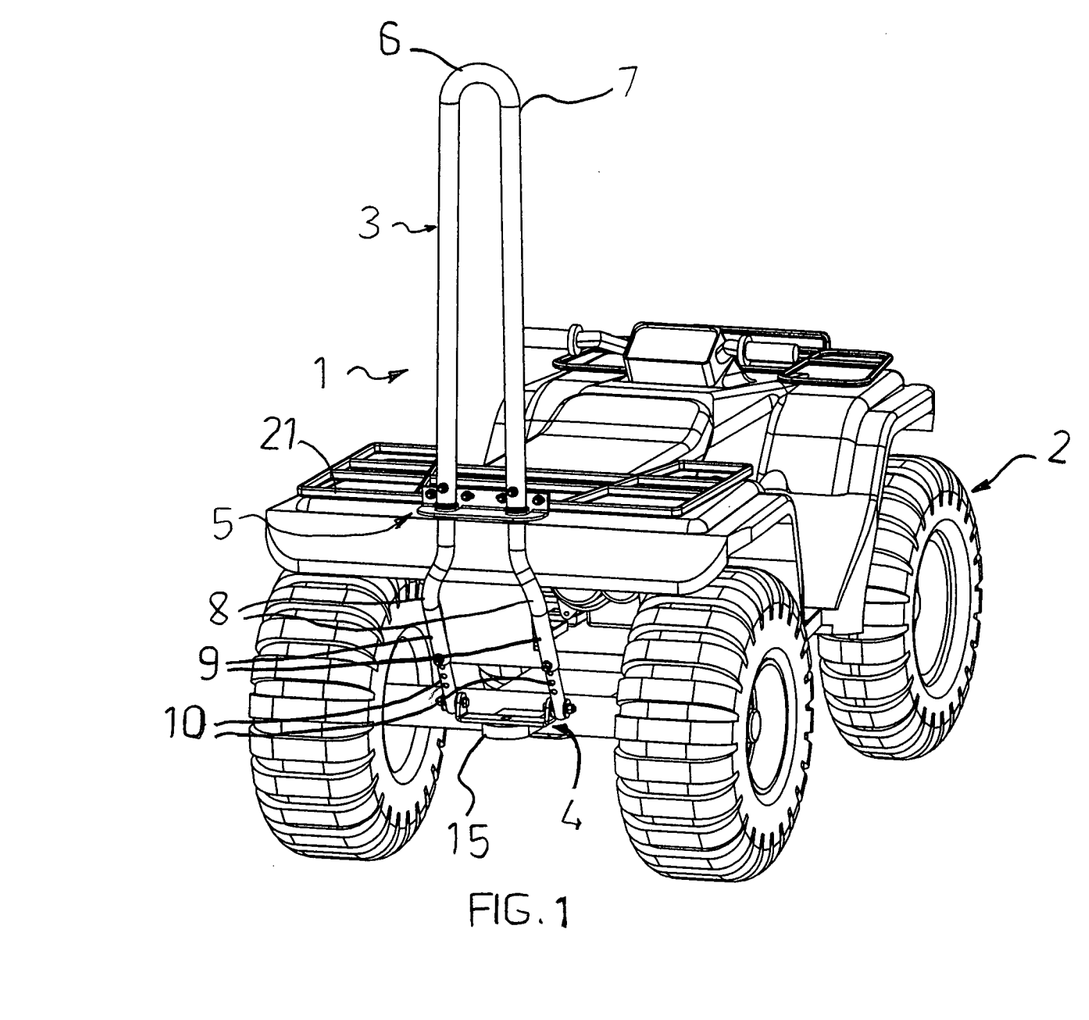
FIG. 1 is a rear perspective view of an all-terrain vehicle (ATV) fitted with a roll-over protection system, according to an embodiment of the invention.
Figure 2:
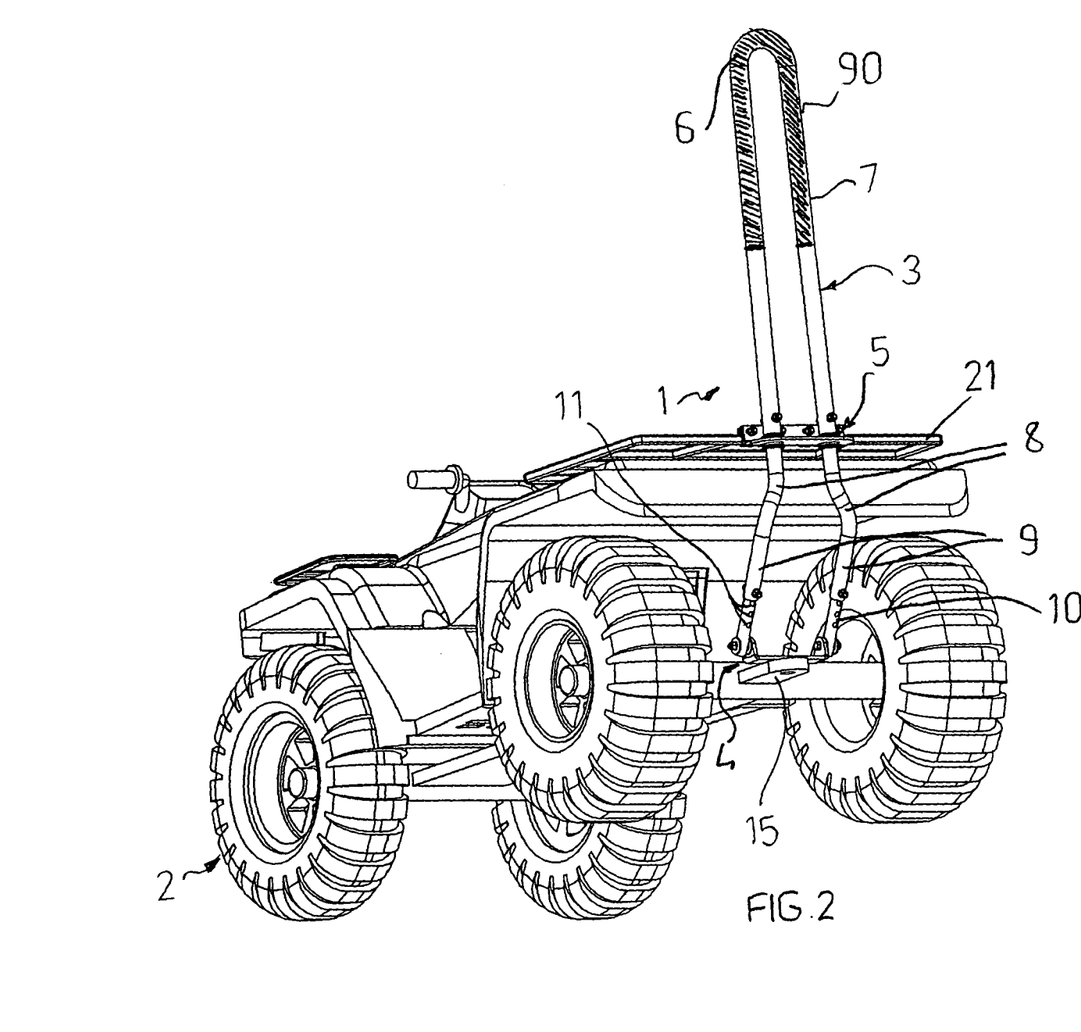
FIG. 2 is another rear perspective view of the ATV and roll-over protection system shown in FIG. 1.
Figure 3:
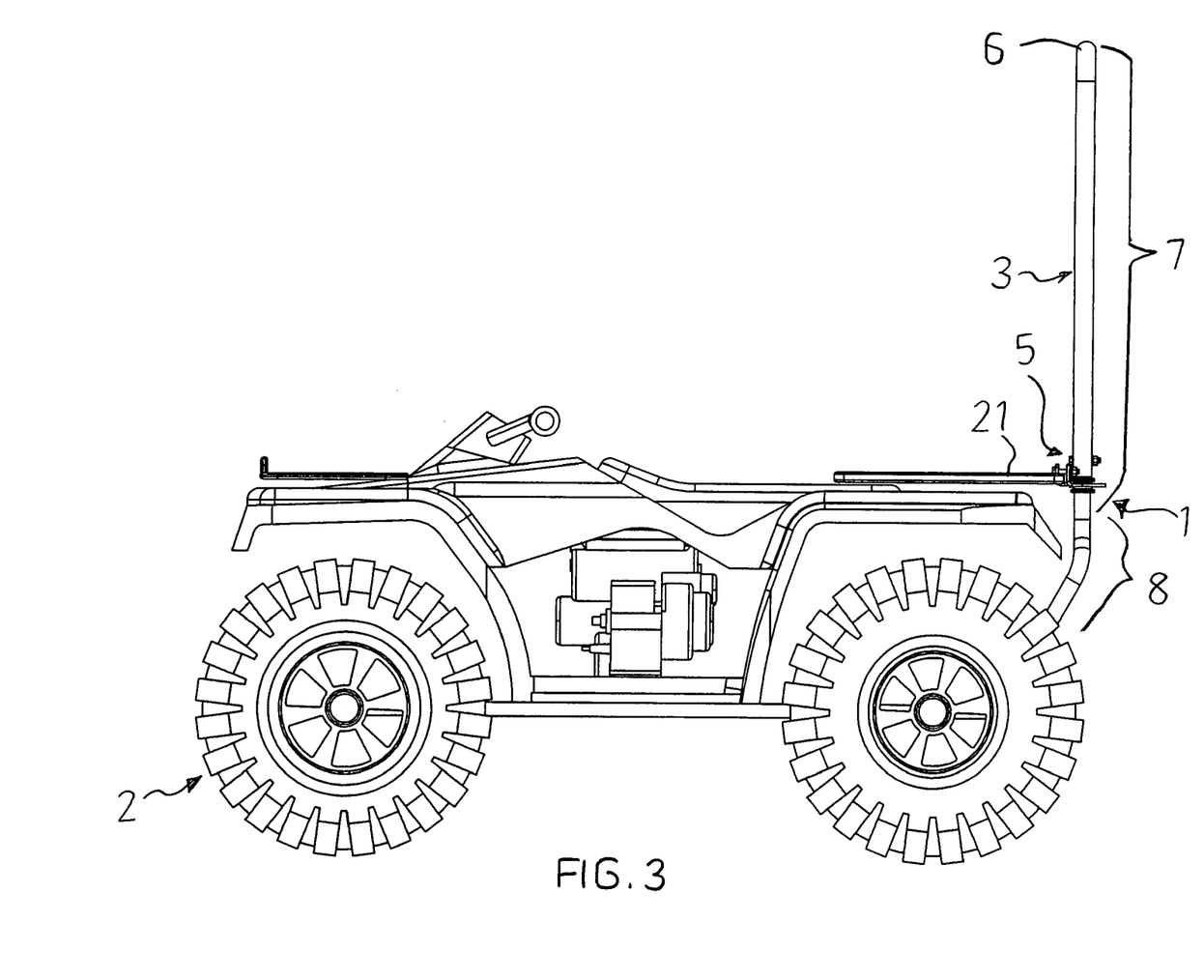
FIG. 3 is a side elevation view of the ATV and roll-over protection system shown FIG. 1.
Figure 4:
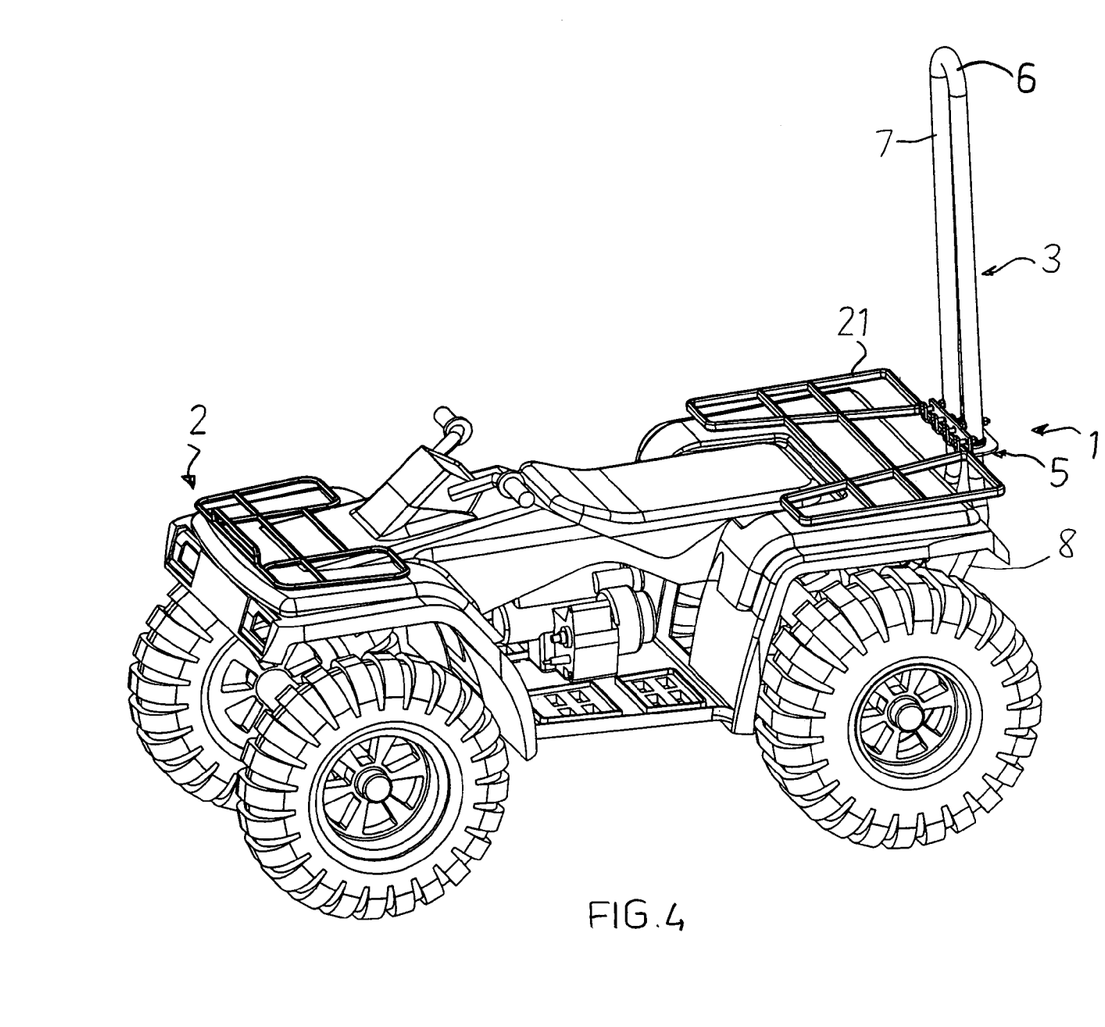
FIG. 4 is a side perspective view of the ATV and roll-over protection system shown in FIG. 1.
Figure 5:
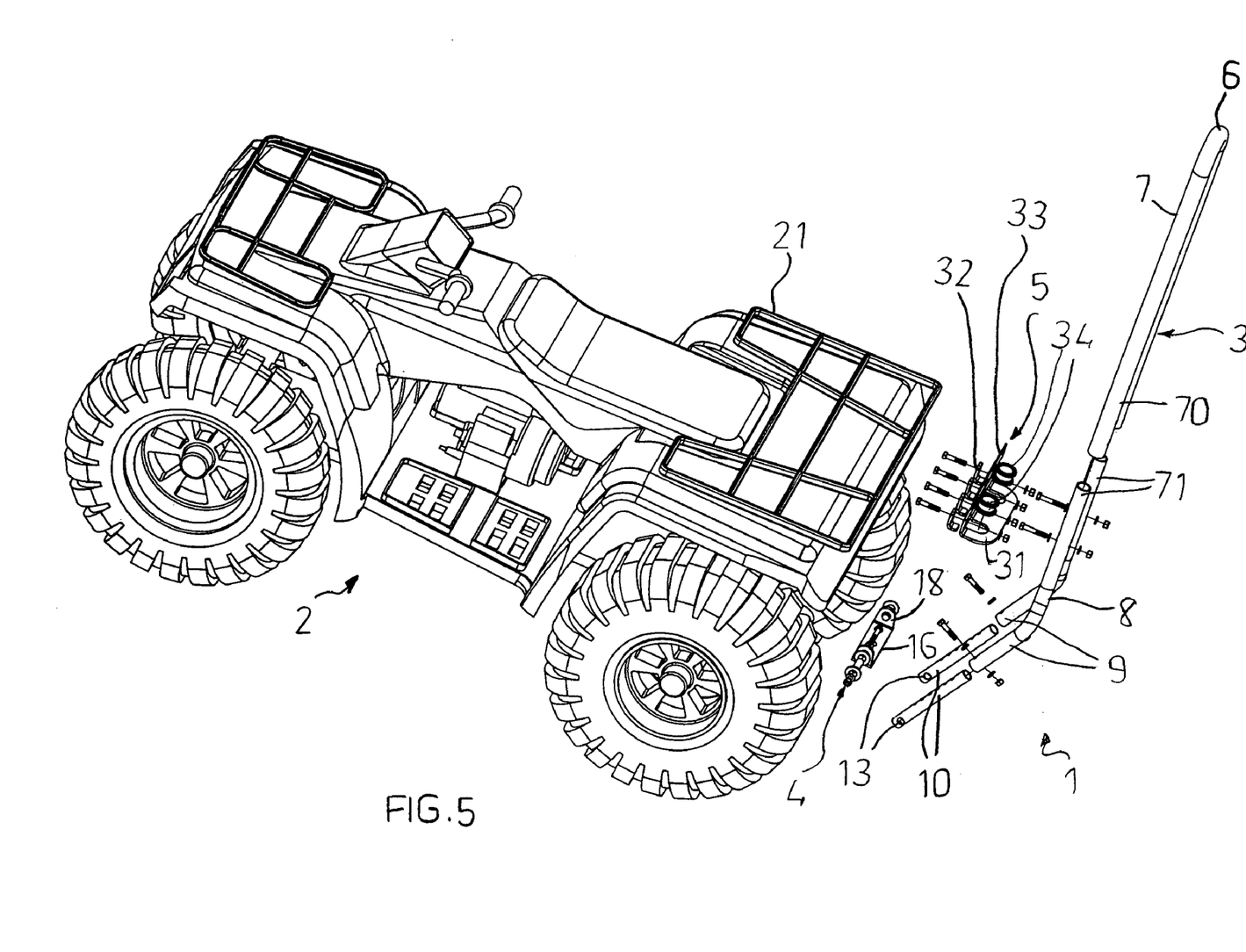
FIG. 5 is an exploded top side perspective view of the roll-over protection system shown in FIG. 1.
Figure 6:
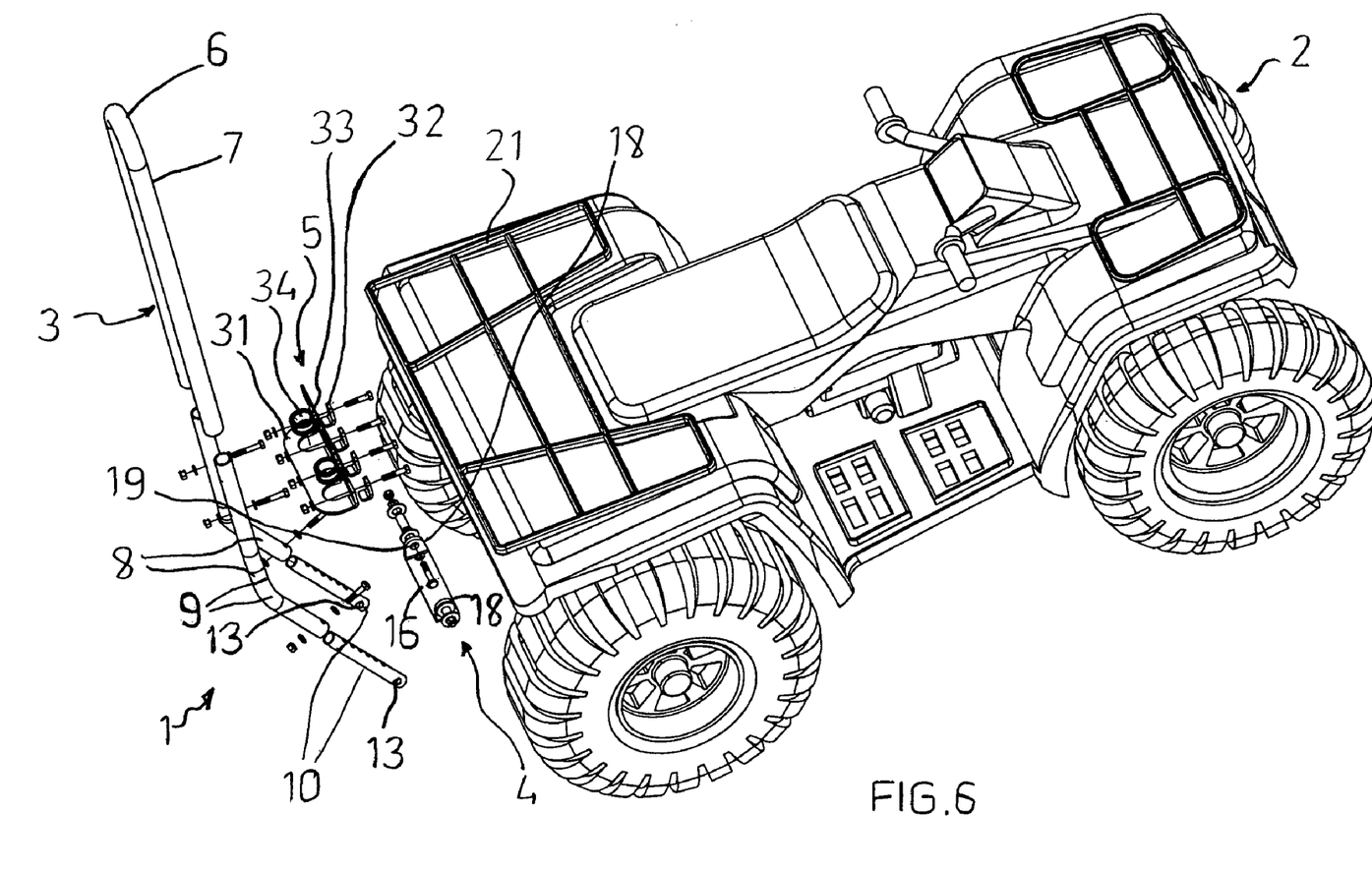
FIG. 6 is another exploded top side perspective view of the roll-over protection system shown in FIG. 1.

As seen in FIG. 2, the first mount 4 is attachable to a tow bar 15 of the vehicle 2. As seen in FIGS. 7 and 8, the first mount 14 comprises a bracket 16 having a central aperture 17 and upturned ends 18. Each end 18 has an aperture 19. A tow ball (not shown) of the vehicle 2 extends through the aperture 17 and secures the bracket 16 to the tow bar 15.

As seen in FIGS. 7 and 8, the first mount 4 further comprises a pair of nuts 22, a pair of bolts 23, a pair of bushes 24, two pairs of anti-rattle nylon washers 25, 26, and a pair of metal washers 27, 28. These are used to pivotally connect lower leg piece 10 to each upturned end 18 by way of the bolts 23 (pivot pins) passing through apertures 13 and 19. Assemblage is in the following order: bolt (head) 23, metal washer 28, bracket upturned end 18, nylon washer 25, wall of lower piece 10, bush 24 (extending within piece 10), wall of lower piece 10, nylon washer 26, metal washer 27, and nut 22.

The configuration of the lower region 8 and the first mount 4 enables the tow ball 20 to be used normally.

The second mount 5 is attachable to a rack 21 of the vehicle 2. As seen in FIGS. 7 and 8, the second mount 5 comprises an angle bracket 31, a bush support plate 33 that supports a pair of nylon wear bushes 34, four L-shaped clamping members 32 (only some of which have been labelled), and four bolts 38 (only some of which have been labelled), four nuts 39 (only some of which have been labelled) and four washers 40 (only some of which have been labelled) for securing the bracket 31, support plate 33 and clamping members 32 to the rack 21.

A vertically extending portion 41 of the bracket 31 has slits/slotted openings 42 (only some of which had been labelled) for receiving the bolts 38. A horizontally extending portion 43 of the bracket 31 has openings 44 through which extend the bushes 34.

The bush support plate 33 has slits/slotted openings 46 (only some of which have been labelled) for receiving the bolts 38.

A vertically extending portion of each clamping member 32 has a slit/slotted opening 47 (only some of which have been labelled) for receiving the bolts 38. The slits 42, 46 and 47 allow for adjustment of the bracket 31, support plate 33 and clamping members 32 relative to one another during attachment to the rack 21. That is, the slits 42, 46 and 47 provide flexibility/adjustability as to how the second upper mount 5 may be attached to a vehicle.

In order to fasten the second mount 5 to the rack 21, the bracket 31 and the support plate 33 are positioned on one side of a cross piece of the rack 21, the clamping members 32 are positioned on the other side of the cross piece and such that the clamping members 32 hook beneath the cross piece, and the bolts 38 are extended through coinciding slits 42, 46, 47 of the bracket 31, support plate 33 and clamping members 32.

In order to mount the system 1 to a vehicle 2, the lower leg piece 10 is pivotally connected to bracket 16 of the first mount 4, the first mount 4 is then secured to the tow plate 15 using a tow ball, the second mount 5 is attached to the rack 21, the upper region 7 of the guard 3 is extended through the wear bushes 34, and the upper leg pieces 9 and lower leg pieces 10 are pinned together.

In use, the first 4 and second mounts 5 move relative to each other during normal use of the vehicle 2, due to the vehicle's suspension system. When relative movement occurs, the first mount 4 enables the guard 3 to pivot relative thereto and the second mount 5 enables the guard 3 to slide relative thereto. Should the vehicle 2 begin to roll-over on its side or back flip, the guard 3 prevents the vehicle 2 from turning upside down completely or remaining completely upside down should it have completely overturned, and either seriously injuring the rider or pinning the rider between the vehicle 2 and the ground. If the vehicle 2 rolls over on its side, the length and shape of the guard 3 helps prevent the vehicle 2 from rolling completely upside down and from pinning the rider whilst on its side. Also, the rubber sleeve 90 encourages the vehicle 2 to slide along the ground rather than to roll over completely. Should the vehicle 2 begin to back flip, the length and shape of the guard 3 will encourage the vehicle 2 to further fall sideways rather backflip to a completely upside down position. In some instances, the vehicle 2 may even rear up and come to a rest on the guard 3 in that position.

The rounded shape of the upper region 7 of the guard 3 reduces the likelihood of the guard 3 digging in if the vehicle is completely upside down. The guard 3 provides a clearance for the rider between the top of the guard 3 and the ground should the vehicle 2 roll over completely, such that the rider will not be crushed. Also, the area of the guard making contact with the ground is minimal, hence reducing the chances of the rider being pinned by the guard in both a sideways or upside down position.

The height and shape of the guard 3 as exemplified allows maneuverability in areas where overhead space is limited, eg. under overhanging branches of trees and archways. The rider cannot fall backwards through the guard 3, nor can the rider's head pass between the legs of the guard 3.

The advantages of the present invention as exemplified include that: it prevents a vehicle from turning upside down and remaining completely upside down; it can be securely mounted at two different regions of a vehicle, even though those regions may move relative to each other; it can be retrofitted to a variety of vehicles; it does not inhibit use of the tow ball of the vehicle; it does not inhibit the vehicle's suspension; and, the guard can serve as a lever for turning the (250 kg-300 kg) vehicle the right way up should it have turned over on its side.

Alternatively, the guard as exemplified may be rigidly mounted to a small vehicle, such as an ATV or a ride-on mower, using one or more mounts. Also, the legs need not be telescopic, nor does the lower region need to extend towards the front of the vehicle. Furthermore, if desired, the guard may have only one upwardly extending leg as opposed to two. Such a guard would provide protection to the rider, provided that the leg is strong enough and an upper region of the guard is shaped appropriately such that it cannot dig into the ground.

Those skilled in the art will appreciate that the present invention may be susceptible to variations and modification other then those specifically described. It is to be understood that the present invention encompasses all such variations and modifications that fall within its spirit and scope.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

The invention claimed is:

1. A roll-over protection system for a vehicle comprising:
    an elongate roll-over guard having a lower region and an upper region; and
    at least two mounts for mounting the lower region of the guard to at least two spaced apart regions of the vehicle that move relative to each other during use of the vehicle such that the guard extends upwardly from the vehicle so as to prevent the vehicle from rolling upside down or remaining upside down should the vehicle have rolled over,
    wherein a first said mount is attachable to a lower rear region of the vehicle, a second said mount is attachable to an upper rear region of the vehicle, and one or both said mounts allow for movement of the guard relative to the vehicle.

2. The roll-over protection system of claim 1, wherein the guard comprises opposed sides that converge with one another at the upper region.

3. The roll-over protection system of claim 1, wherein the guard is in the shape of a hairpin having a bend and legs extending from the bend, and the bend is located at the upper region.

4. The roll-over protection system of claim 1, wherein the upper region extends substantially vertically and the lower region extends downwardly and towards a front end of the vehicle.

5. The roll-over protection system of claim 1, wherein the guard is of adjustable length.

6. The roll-over protection system of claim 1, wherein the lower rear region of the vehicle is selected from the group consisting of a tow bar, axle, lower body, undercarriage and chassis of the vehicle.

7. The roll-over protection system of claim 1, wherein the upper rear region of the vehicle is selected from the group consisting of a tray, rack, carriage, bumper, seat, cab and upper body of the vehicle.

8. The roll-over protection system of claim 1, wherein the first mount allows for pivotal movement of the guard relative to the vehicle.

9. The roll-over protection system of claim 1, wherein the second mount allows the guard to slide relative to the vehicle.

10. The roll-over protection system of claim 1, wherein the vehicle is selected from the group consisting of a small open motorised buggy, mini-excavator and ride-on mower.

11. A roll-over protection system for a vehicle comprising:
    a roll-over guard; and
    at least two mounts for mounting the guard to at least two spaced apart regions of the vehicle that may move relative to each other,
    wherein in use, the guard extends upwardly from the vehicle so as to prevent the vehicle from rolling upside down or remaining upside down should the vehicle have rolled over, and at least one of said mounts is moveable relative to the guard when the two spaced apart regions move relative to each other.

12. The roll-over protection system of claim 11, wherein a first of the mounts is attachable to a lower rear region of the vehicle and a second of the mounts is attachable to an upper rear region of the vehicle, wherein the lower rear region of the vehicle is a tow bar.

13. The roll-over protection system of claim 11, wherein one of said mounts allows for pivotal movement of the guard relative to the vehicle.

14. The roll-over protection system of claim 11, wherein one of said mounts allows the guard to slide relative to the vehicle.

15. The roll-over protection system of claim 11, wherein the guard is in the shape of a hairpin, an upper region of the hairpin extends substantially vertically and a lower region of the hairpin extends downwardly and towards a front end of the vehicle.

* * * * *